(12) United States Patent
Bermudez Rodriguez et al.

(10) Patent No.: US 10,561,077 B2
(45) Date of Patent: Feb. 18, 2020

(54) PRESSURE DRIVEN IRRIGATION SYSTEM

(71) Applicant: INTERNATIONAL BUSINESS MACHINES CORPORATION, Armonk, NY (US)

(72) Inventors: Sergio A. Bermudez Rodriguez, Boston, MA (US); Levente Klein, Tuckahoe, NY (US); Alejandro G. Schrott, New York, NY (US); Theodore G. van Kessel, Millbrook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 589 days.

(21) Appl. No.: 15/063,750

(22) Filed: Mar. 8, 2016

(65) Prior Publication Data
US 2017/0258018 A1  Sep. 14, 2017

(51) Int. Cl.
*A01G 25/02*  (2006.01)
*A01G 25/16*  (2006.01)
*B05B 12/00*  (2018.01)
*B05B 12/04*  (2006.01)

(52) U.S. Cl.
CPC ......... *A01G 25/023* (2013.01); *A01G 25/165* (2013.01); *B05B 12/00* (2013.01); *B05B 12/04* (2013.01)

(58) Field of Classification Search
CPC .... A01G 25/023; A01G 1/001; A01G 17/005; A01G 25/16–167; A01G 25/02–097; A01G 2025/006; B05B 17/06; B05B 1/3006; B05B 1/323; B05B 7/1254; B05B 12/00; B05B 12/04; B05B 12/085
USPC ............... 700/280, 284; 181/254; 239/63–71
See application file for complete search history.

(56) References Cited

U.S. PATENT DOCUMENTS

| | | | |
|---|---|---|---|
| 4,209,131 A * | 6/1980 | Barash | ................. A01G 25/16 137/624.2 |
| 4,893,655 A | 1/1990 | Anderson | |
| 6,652,188 B1 * | 11/2003 | Albright | ............... A01G 25/167 137/78.3 |
| 7,383,721 B2 | 6/2008 | Parsons et al. | |
| 7,899,580 B2 | 3/2011 | Cardinal et al. | |
| 8,448,824 B2 | 5/2013 | Diperna | |
| 8,733,155 B2 * | 5/2014 | Hill | ....................... B05B 12/008 137/78.3 |
| 8,918,294 B2 | 12/2014 | Stevens et al. | |
| 2003/0107013 A1 | 6/2003 | Pappo et al. | |

(Continued)

*Primary Examiner* — Cody J Lieuwen
(74) *Attorney, Agent, or Firm* — Tutunjian & Bitetto, P.C.; Vazken Alexanian

(57) ABSTRACT

A system and method for water irrigation system are provided. The water irrigation system includes a set of pressure modulators for generating a set of modulated pressure signals that include an actuating pressure signal and a de-actuating pressure signal. The water irrigation system includes a set of irrigating elements. Each of the irrigating elements includes a water emitter connected to a pressure sensing circuit. The pressure sensing circuit is for actuating the water emitter responsive to the actuating signal and de-actuating the water emitter responsive to the de-actuating signal. The water irrigation system further includes tubing for carrying water for irrigation and the modulated pressure signals to the irrigating element.

18 Claims, 12 Drawing Sheets

(56) References Cited

U.S. PATENT DOCUMENTS

2004/0128034 A1    7/2004   Lenker et al.
2006/0202051 A1*   9/2006   Parsons .................. A01G 25/16
                                                                    239/69
2015/0204454 A1    7/2015   Hurst \* cited by examiner

PRESSURE DRIVEN IRRIGATION SYSTEM

BACKGROUND

Technical Field

The present invention relates generally to information processing and, in particular, to an acoustic pressure driven irrigation system.

Description of the Related Art

Efficient irrigation systems with accurate local control of water delivery become increasingly necessary in agriculture to manage plans individually in order to increase yield and address the increasing water scarcity due to demand and climatic variations. In particular, for vineyards, irrigation by dripping water along the vine rows has been a widely adopted method, and ways of water delivery control based on average conditions of the soil have been developed. However, in areas where the value of the land is very high, an additional benefit can be achieved by full automation of the irrigation system and differential irrigation, even if conditions such as slope, wind incidence, soil quality, and so forth, vary along the irrigated line. Thus, there is a need for a method capable of locally controlling the water delivery within the scale of meters.

SUMMARY

According to an aspect of the present principles, a water irrigation system is provided. The water irrigation system includes a set of pressure modulators for generating a set of modulated pressure signals that include an actuating pressure signal and a de-actuating pressure signal. The water irrigation system includes a set of irrigating elements. Each of the irrigating elements includes a water emitter connected to a pressure sensing circuit. The pressure sensing circuit is for actuating the water emitter responsive to the actuating signal and de-actuating the water emitter responsive to the de-actuating signal. The water irrigation system further includes tubing for carrying water for irrigation and the modulated pressure signals to the irrigating element.

According to another aspect of the present principles, a method for water irrigation is provided. The method includes configuring a set of pressure modulators to generate a set of modulated pressure signals that include an actuating pressure signal and a de-actuating pressure signal. The method further includes configuring a set of irrigating elements, each including a water emitter connected to a pressure sensing circuit, such that the pressure sensing circuit actuates the water emitter responsive to the actuating signal and de-actuates the water emitter responsive to the de-actuating signal. The method also includes configuring tubing to carry water for irrigation and the modulated pressure signals to the irrigating element.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to an acoustic pressure driven irrigation system.

In an embodiment, the present principles can provide a method capable of locally controlling the water delivery within the scale of meters. In an embodiment, the control will respond to assessments of local properties that are growing plants, where the assessment can be provided by a variety of methods such as, for example, but not limited to, satellite images, local sensors, and so forth.

In an embodiment, the present principles determine the water need of individual plants based on the moisture level of the soil or the moisture within a plant. These variations are determined spatially across a large area and the irrigation system is capable to respond to these variations by differentially delivering the amount of water such that soil moisture or plant vigor determined through its greenness and leaf area index became uniform across the original irrigated area. In order to achieve this, the water is delivered differentially, meaning that a drier area will be irrigated for a longer period of time, while a wetter area will be irrigated less.

In an embodiment, the present principles control the amount of water delivered to the soil along the length of an irrigation pipe. The water delivered by different segments of the irrigation pipe is controlled by setting the desired irrigation pattern, selectively opening or closing local irrigation nozzles along the irrigation line following results from periodic observation through satellite, airplane, drones, or using a distributed sensor network across the area. Once the irrigation requirement is determined, it is transmitted to a central computer that will issue commands to various segments of the irrigation system such that different amounts of water are delivered. A soil moisture sensor network distributed across the area can provide feedback when the moisture level reaches a level that is uniform across the area or reaches a desired threshold.

Figure 1:
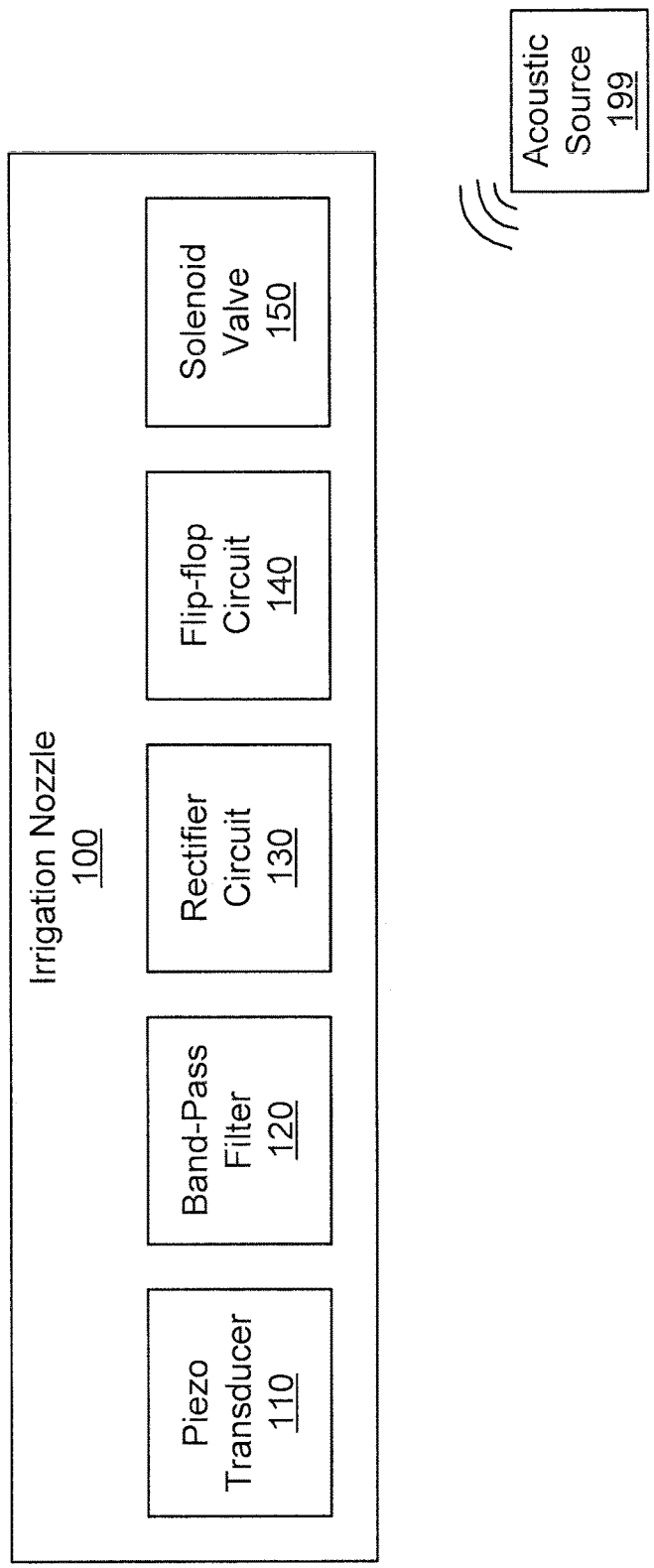
FIG. 1 shows an exemplary irrigation nozzle 100 for an analytics driven irrigation system, in accordance with an embodiment of the present principles.

FIG. 1 shows an exemplary irrigation nozzle 100 for an analytics driven irrigation system, in accordance with an embodiment of the present principles. The irrigation nozzle 100 is configured to be responsive to acoustic signal transmission.

The irrigation nozzle 100 includes a piezo transducer 110, a band-pass filter 120, a rectifier circuit 130, a flip-flop circuit 140, and a solenoid valve 150.

The irrigation nozzle 100 is configured to be responsive to sound emanating from an acoustic source 199. The acoustic source 199 can include an amplifier. The acoustic source 199 can be, for example, but is not limited to, a speaker and so forth.

The piezo transducer 110 converts sound to an electrical signal. In particular, the pressure caused by the sound emanated from the acoustic source 199 is converted into an electrical signal.

The band-pass filter 120 passes electrical signals having a certain predetermined frequencies.

The rectifier circuit 130 converts an alternating current signal output from the bass-pass filter 120 into a direct current signal.

The flip-flop circuit 140 outputs a signal that changes from 0 to 1 and vice versa depending upon the output of the rectifier circuit. The flip-flop circuit 140 can be an RS or other type of flip-flop circuit.

The solenoid valve 150 opens and closes, depending upon the output signal of the flip-flop circuit 140. The solenoid valve 150 is interchangeably referred to herein as a "water emitter".

Figure 2:
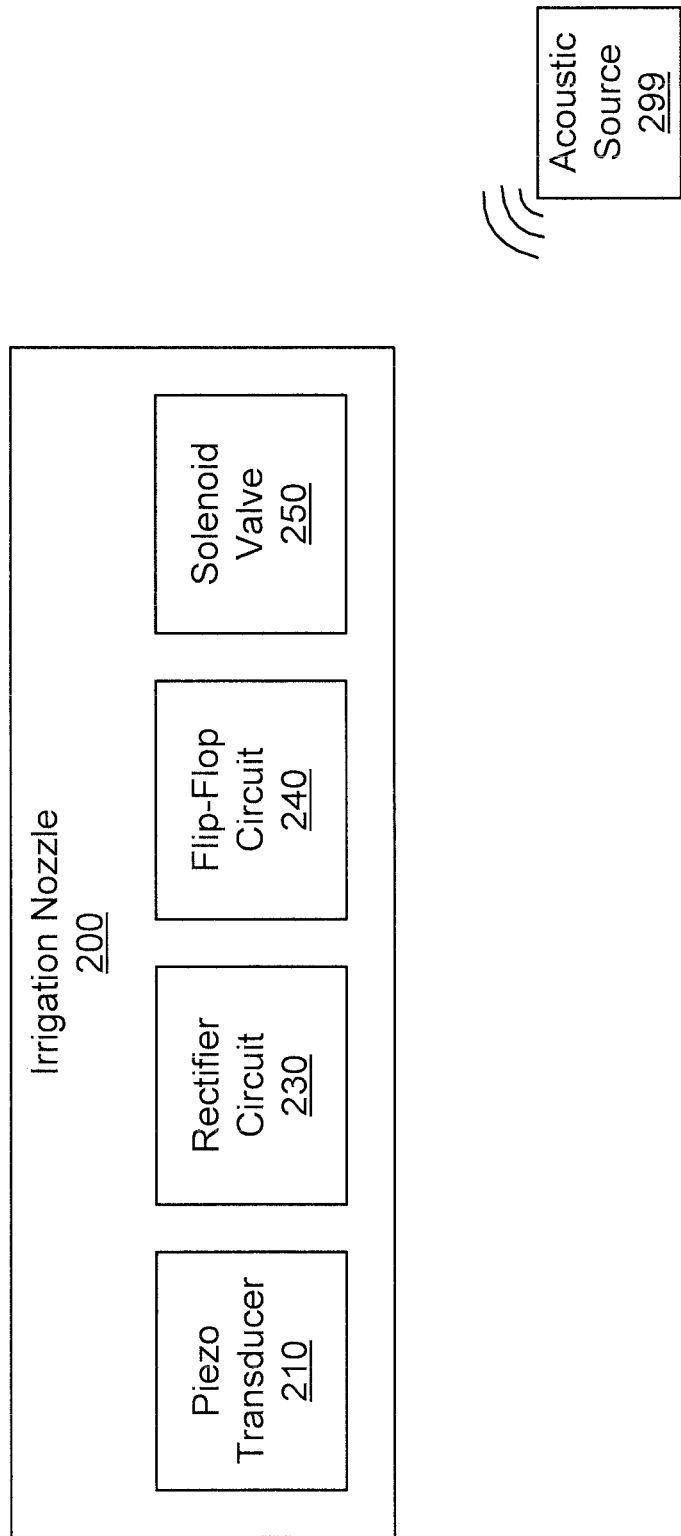
FIG. 2 shows another exemplary irrigation nozzle 200 for an analytics driven irrigation system, in accordance with an embodiment of the present principles.

FIG. 2 shows another exemplary irrigation nozzle 200 for an analytics driven irrigation system, in accordance with an embodiment of the present principles. The irrigation nozzle 200 is configured to be responsive to acoustic signal transmission.

The irrigation nozzle 200 includes a piezo transducer 210, a rectifier circuit 230, a flip-flop circuit 240, and a solenoid valve 250.

The irrigation nozzle 200 is configured to be responsive to sound emanating from an acoustic source 299. The acoustic source 299 can include an amplifier. The acoustic source 299 can be, for example, but is not limited to, a speaker and so forth.

The speed of sound in water is approximately 1500 m/s, which provides a long single propagation at low signal frequencies. For a 1 km long pipeline, with two ends having a membrane, $f_0 = C/2L = 0.75$ Hz. Then, for example:
  $f_{40} = 30$ Hz, a pressure max occurs every 25 m
  $f_{60} = 45$ Hz a pressure max occurs every 16.6 m.

Thus, by adequately positioning the irrigation nozzles 200, they can be opened and closed selectively by varying sound frequency. Moreover, because of the resonant conditions, the irrigation nozzles 200 may be powered by the acoustic energy alone.

Figure 3:
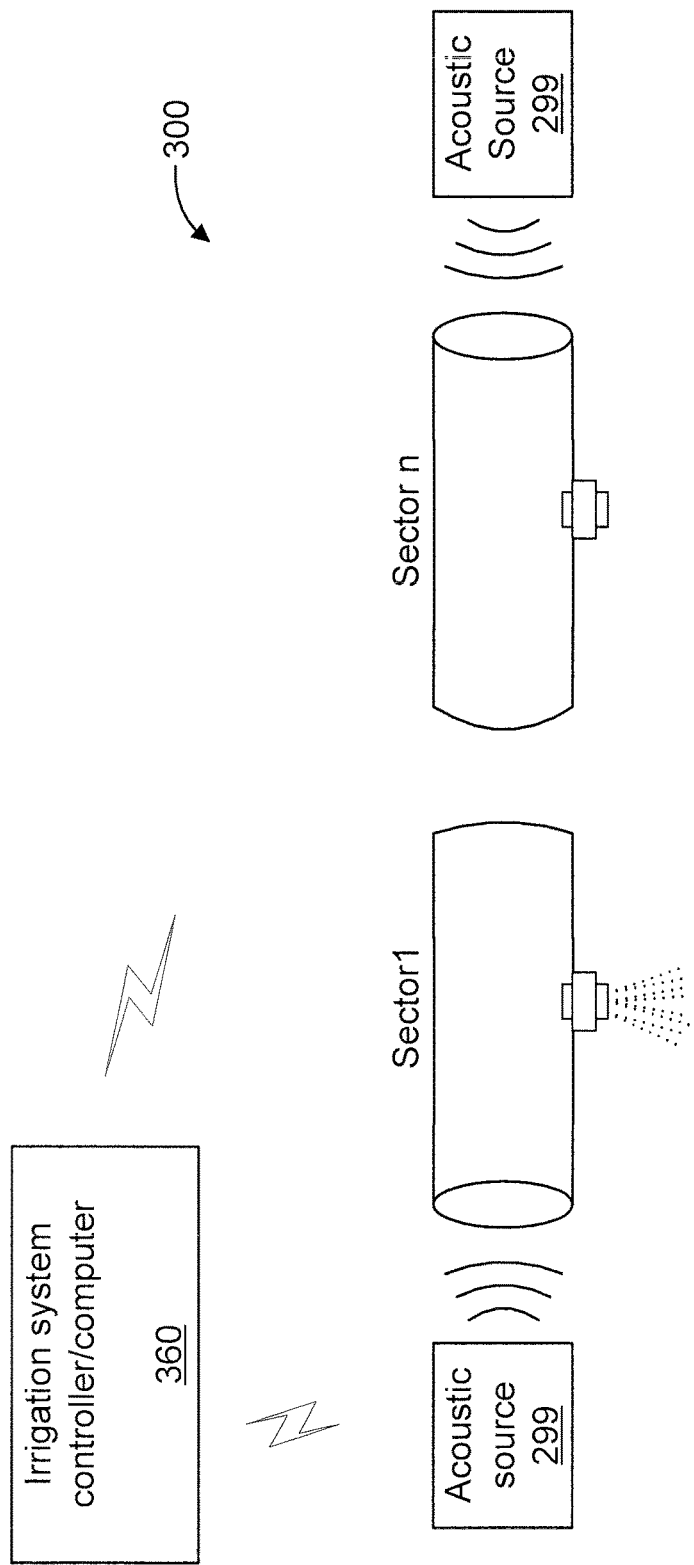
FIG. 3 shows an exemplary configuration 300 of irrigation nozzles for an analytics driven irrigation system, in accordance with an embodiment of the present principles.

FIG. 3 shows an exemplary configuration 300 of irrigation nozzles for an analytics driven irrigation system, in accordance with an embodiment of the present principles.

The configuration 300 involves sector 1 through sector n, where each sector includes one or more irrigation nozzles (e.g., such as nozzle 100 of FIG. 1 or nozzle 200 of FIG. 2). Moreover, the configuration 300 can involve an acoustic source 399 per sector as shown, as can use one acoustic source for more than one (e.g., all) sector.

The acoustic sources 399 can be controlled via an irrigation system controller/computer 360. The controller/computer 360 can be centrally located. The controller/computer 360 can communicate with the acoustic sources 399 using wired or wireless technology.

Figure 4:
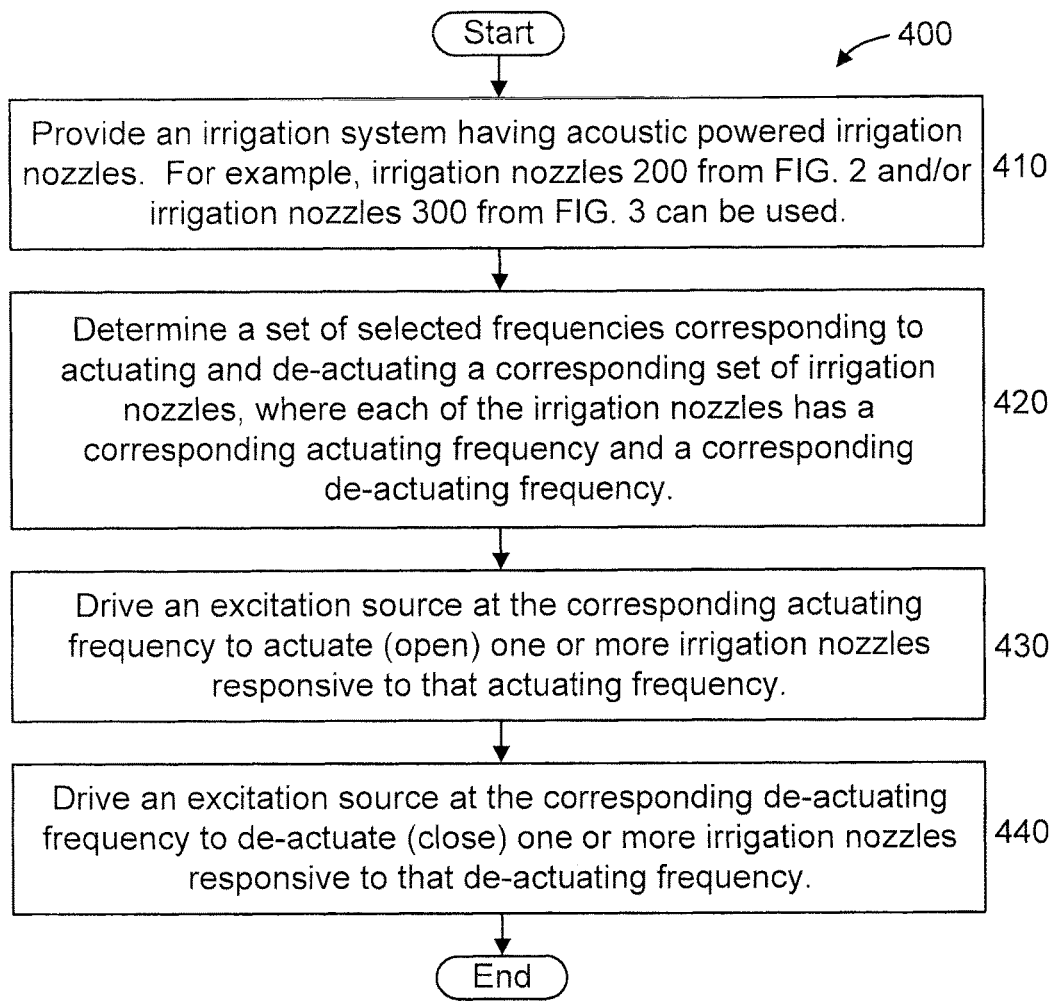
FIG. 4 shows an exemplary method 400 for analytics driven irrigation, in accordance with an embodiment of the present principles.

FIG. 4 shows an exemplary method 400 for analytics driven irrigation, in accordance with an embodiment of the present principles.

At step 410, provide an irrigation system having acoustic powered irrigation nozzles. For example, irrigation nozzles 200 from FIG. 2 and/or irrigation nozzles 300 from FIG. 3 can be used.

At step 420, determine a set of selected frequencies corresponding to actuating and de-actuating a corresponding set of irrigation nozzles, where each of the irrigation nozzles has a corresponding actuating frequency and a corresponding de-actuating frequency.

At step 430, drive an excitation source at the corresponding actuating frequency to actuate (open) one or more irrigation nozzles responsive to that actuating frequency.

At step 440, drive an excitation source at the corresponding de-actuating frequency to de-actuate (close) one or more irrigation nozzles responsive to that de-actuating frequency.

Figure 5:
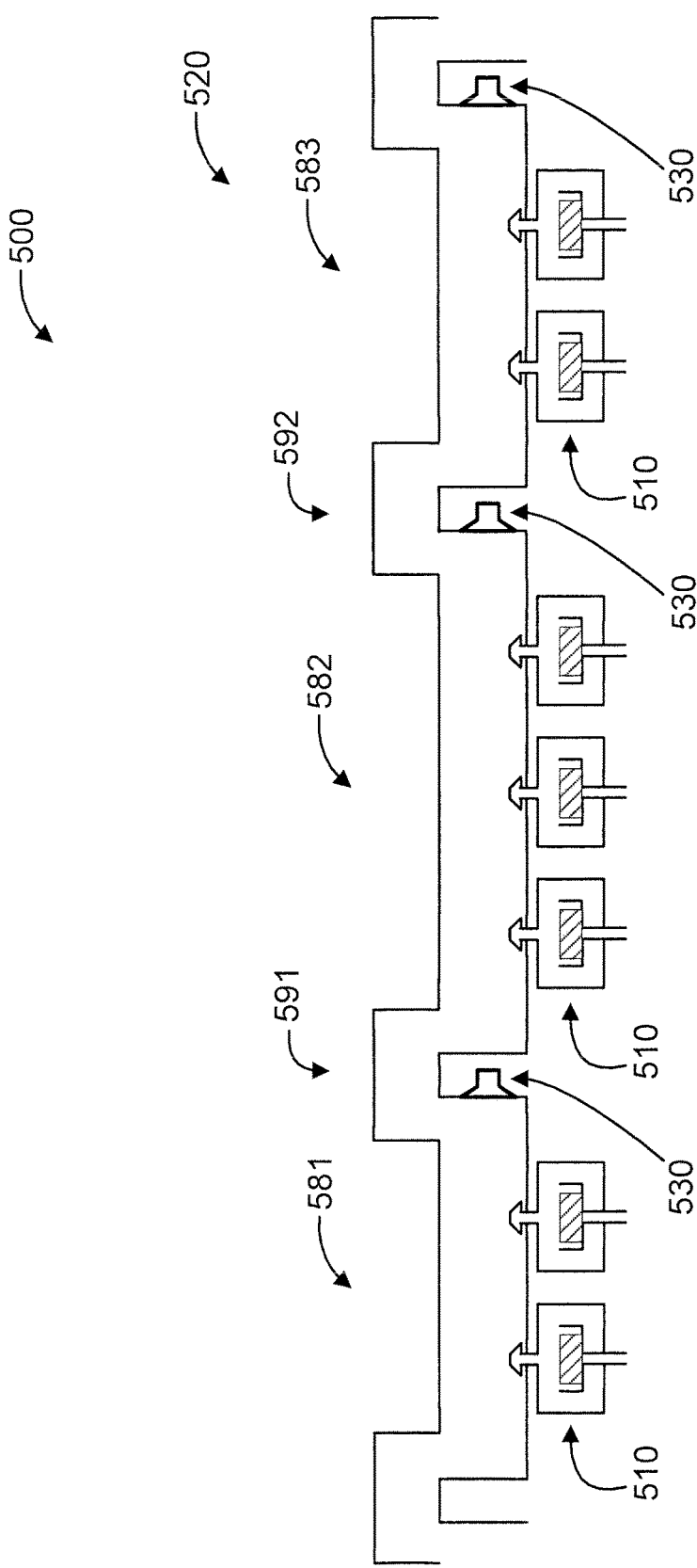
FIG. 5 shows an exemplary variable rate drip irrigation system 500, in accordance with an embodiment of the present principles.

FIG. 5 shows an exemplary variable rate drip irrigation system 500, in accordance with an embodiment of the present principles.

The variable rate drip irrigation system 500 involves a set of water emitters (collectively and individually denoted by the reference numeral 510), a set of drip tubes (collectively and individually denoted by the reference numeral 520), and a set of acoustic transmitters (collectively and individually denoted by the reference numeral 530). In an embodiment, the acoustic transmitters 530 can be speakers. Accordingly, for at least the embodiment of FIG. 5, the terms "acoustic transmitter" and "speaker" are used interchangeably herein.

Figure 6:
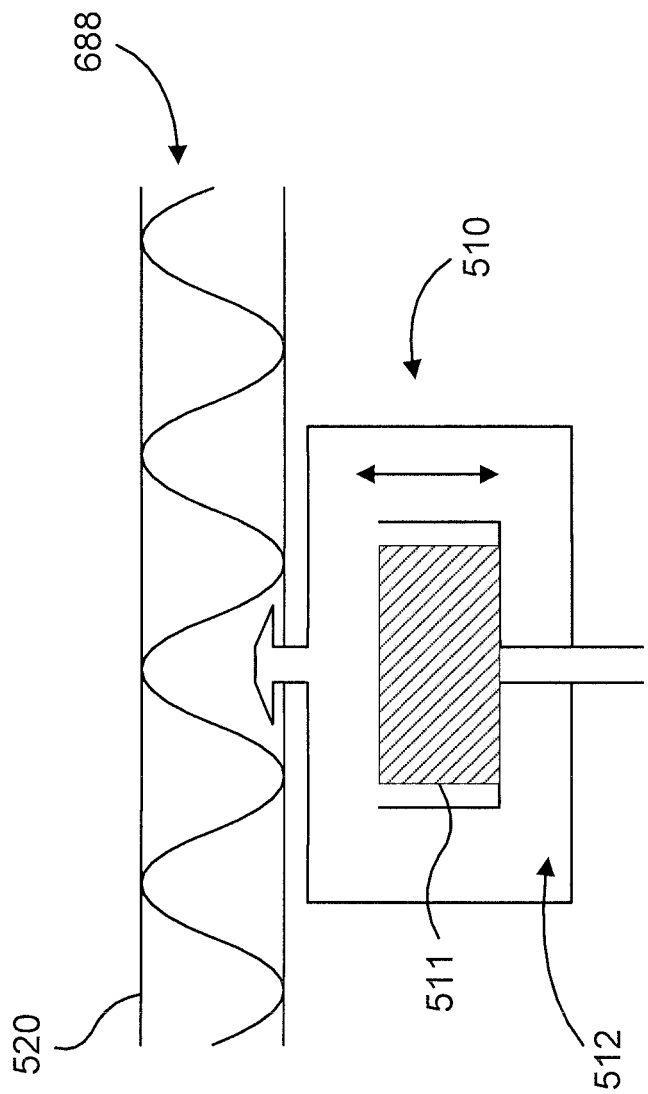
FIG. 6 further shows one of the water emitters 510 and a portion of drip tube 520 of FIG. 5 in a closed (blocked) position, in accordance with an embodiment of the present principles.
Figure 7:
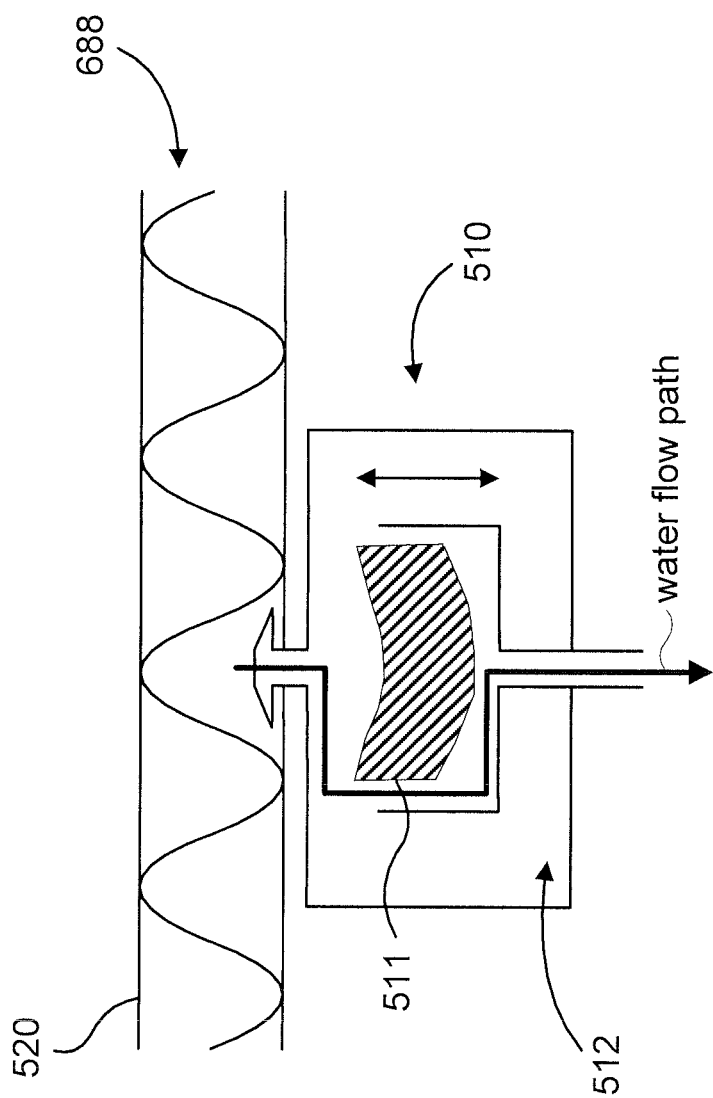
FIG. 7 further shows one of the water emitters 510 and a portion of drop tube 520 of FIG. 5 in an open (unblocked) position, in accordance with an embodiment of the present principles.

FIG. 6 further shows one of the water emitters 510 and a portion of drip tube 520 of FIG. 5 in a closed (blocked) position, in accordance with an embodiment of the present principles. FIG. 7 further shows one of the water emitters 510 and a portion of drop tube 520 of FIG. 5 in an open (unblocked) position, in accordance with an embodiment of the present principles.

Each of the water emitters 510 includes an oscillating disk 511 within an emitter cavity 512. The mass and radius of the oscillating disk 511 will determine the frequency of operation for individual emitters. Any suitable material that responds to differences in acoustic pressure under the described conditions (e.g., varying from being wet to dry) can be used to form the oscillating disk 511.

The drip tubes 520 are connected to the acoustic transmitters 530.

A standing/traveling wave 688 will couple to the oscillating disk 511 through the water emitter cavity 512 and will actuate the oscillation (of the oscillating disk 511).

Once the fluid in the drip tube 520 is activated, the water emitters 510 will allow water to drip through it (see FIG. 7).

In an embodiment, each of the water emitters 510 include a vibrating element (oscillating disk 511). The water emitters 510 couple the water in the drip tubes 520 with the external world and allows water to pass through only when the oscillating disks 511 therein are vibrating and water can pass by and be ejected. The system 500 will use a membrane whose frequency is determined by the mass and size of the vibrating disk.

Normally all of the water emitters 510 are closed (see FIG. 6), so there is no dripping.

An acoustic wave is generated by the acoustic transmitter 530, thus establishing a standing wave 688 in that segment of the drip tube 520.

The water emitters 510 are frequency matched to the oscillations of the oscillating disks 511 such that when the acoustic transmitter power is on, the oscillating disks 511 in the water emitters 510 are oscillating and, hence, the system 500 is irrigating.

The power and frequency for each acoustic transmitter 530 (each segment of the irrigation system) can be turned on independently. The length of a segment will determine the size of the irrigation zone and will also control the frequency of the standing wave.

In the exemplary implementation of FIG. 5, the variable rate drip irrigation system 500 includes segments 581, 582, 583 of different lengths. The segments 581, 582, 583 are separated by kinks 591, 592 that would attenuate the oscillation at the end such that in the adjacent segments the pressure will not be attenuated. In operation, the different segments can be activated by providing an alternating current signal to the speaker. The frequency and power of the signal will determine the drip in that segment.

Figure 8:
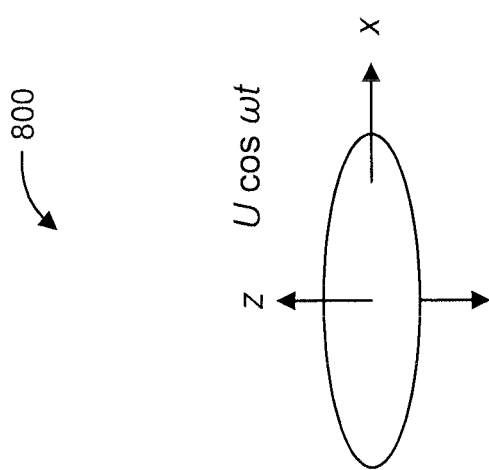
FIG. 8 shows broadside oscillations 800 of a disk in fluid, to which the present principles can be applied, in accordance with an embodiment of the present principles.
Figure 9:
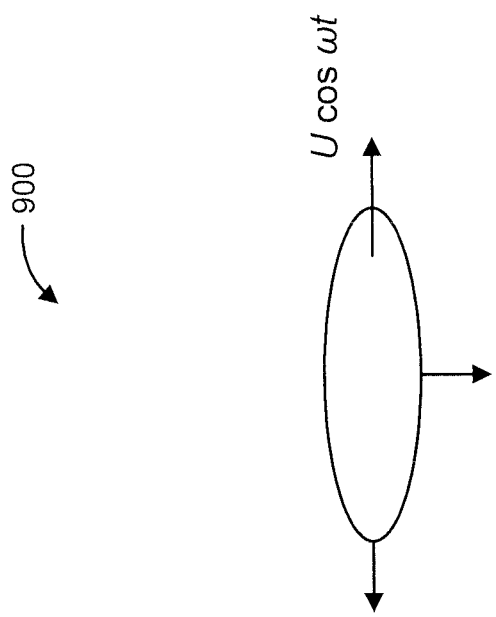
FIG. 9 shows edgewise oscillations 900 of a disk in fluid, to which the present principles can be applied, in accordance with an embodiment of the present principles.
Figure 11:
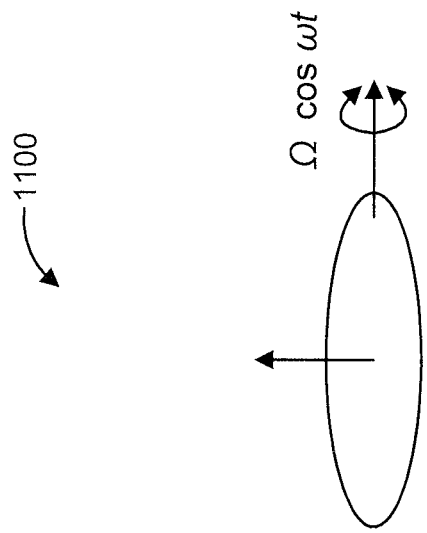
FIG. 11 shows out-of-plane rotary oscillations 1100 of a disk in fluid, to which the present principles can be applied, in accordance with an embodiment of the present principles.
Figure 10:
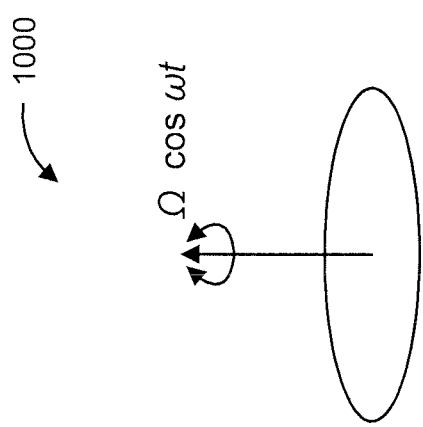
FIG. 10 shows in-plane rotary oscillations 1000 of a disk in fluid, to which the present principles can be applied, in accordance with an embodiment of the present principles.

FIGS. 8-11 show various oscillation modes of a disk in fluid, to which the present principles can be applied, in accordance with an embodiment of the present principles. In particular, FIG. 8 shows broadside oscillations 800, FIG. 9 shows edgewise oscillations 900, FIG. 10 shows in-plane rotary oscillations 1000, and FIG. 11 shows out-of-plane rotary oscillations 1100.

Figure 12:
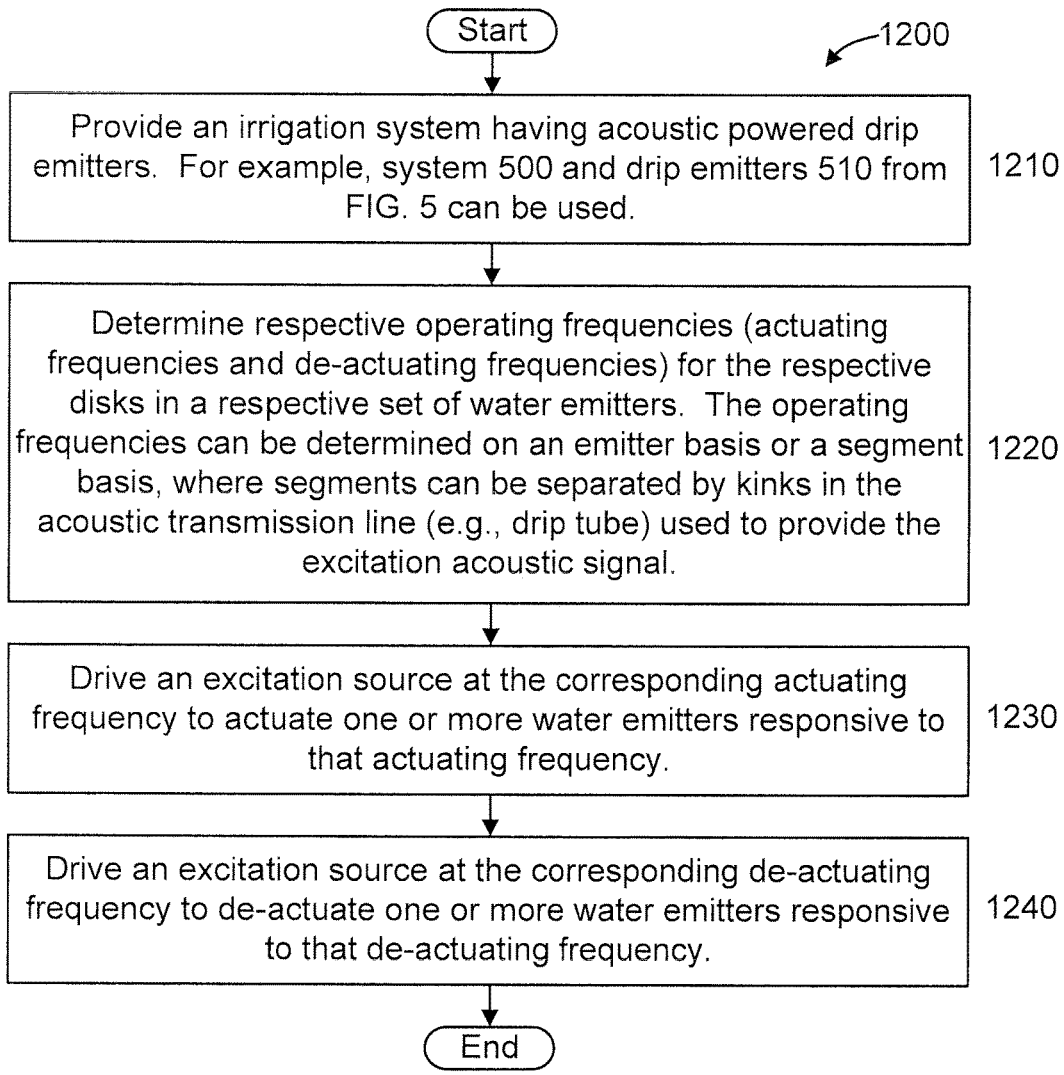
FIG. 12 shows an exemplary method 1200 for variable rate drip irrigation, in accordance with an embodiment of the present principles.

FIG. 12 shows an exemplary method 1200 for variable rate drip irrigation, in accordance with an embodiment of the present principles.

At step 1210, provide an irrigation system having acoustic powered drip emitters. For example, system 500 and drip emitters 510 from FIG. 5 can be used.

At step 1220, determine respective operating frequencies (actuating frequencies and de-actuating frequencies) for the respective disks in a respective set of water emitters. The operating frequencies can be determined on an emitter basis or a segment basis, where segments can be separated by kinks in the acoustic transmission line (e.g., drip tube) used to provide the excitation acoustic signal.

At step 1230, drive an excitation source at the corresponding actuating frequency to actuate one or more water emitters responsive to that actuating frequency.

At step 1240, drive an excitation source at the corresponding de-actuating frequency to de-actuate one or more water emitters responsive to that de-actuating frequency.

In an alternate embodiment, which can be readily applied to system 500, the acoustic transmitter can be used to acoustically address individual drippers by modifying the standing acoustic wave with multiple frequencies such that the amplitude of the wave excites specific emitters and not others. Each membrane is constructed such that it passes droplets of water only when a threshold pressure is exceeded. Waveform addressing is implemented by selecting standing wave frequencies such that only the desired emitters exceed this threshold and are thereby selected. The ability to acoustically address individual elements on a drip line can be used to mitigate the number of segments required and improves the spatial precision of dispensing.

The command to actuate is provided by a central computer that holds the schedule calculated from the maps that quantify the variability of soil moisture or greenness of the canopy. The map is divided into small areas, where the smallest size is the detection resolution of the mapping method and this variability is converted to a command that is issued to an acoustic actuator that will generate the signal for a period of time until the desired amount of water is dispensed.

Figure 13:
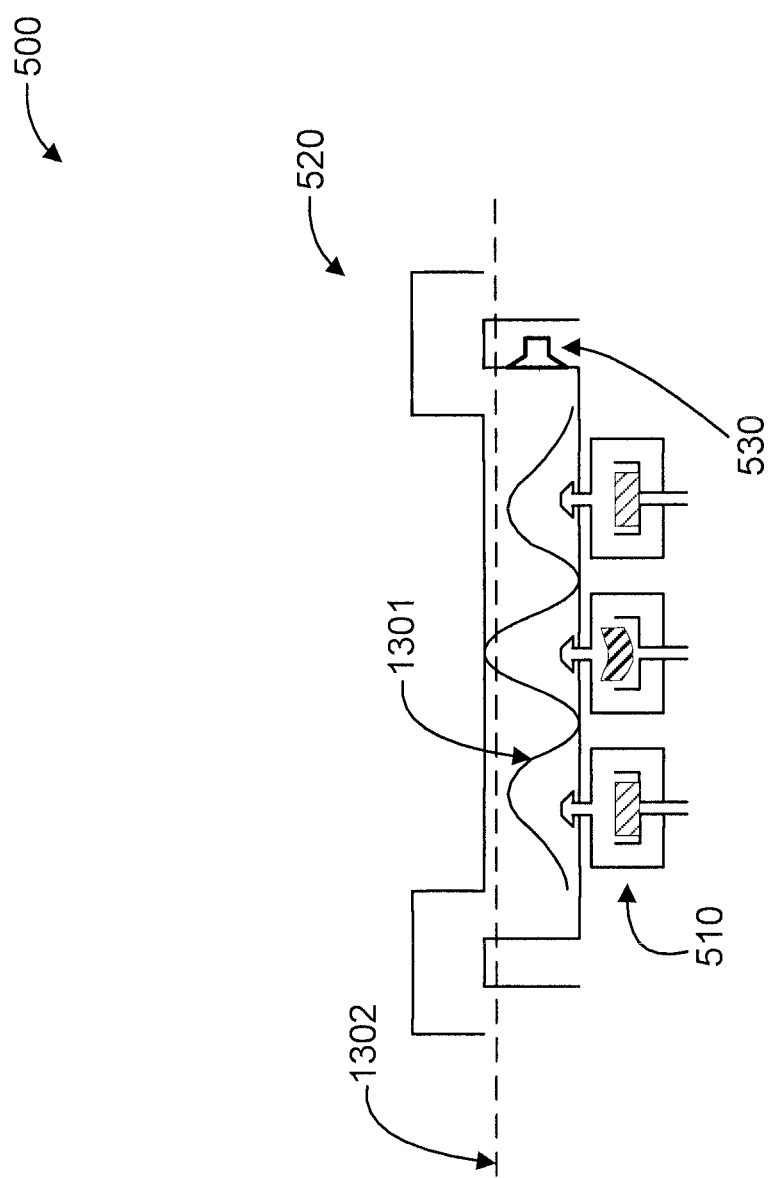
FIG. 13 shows a portion of system 500 of FIG. 5 having a standing wave 1301 in a drip tube thereof with a standing wave magnitude greater than a threshold magnitude, in accordance with an embodiment of the present principles.

FIG. 13 shows a portion of system 500 of FIG. 5 having a standing wave 1301 in a drip tube thereof with a standing wave magnitude greater than a threshold magnitude, in accordance with an embodiment of the present principles.

As shown, the magnitude of the standing wave 1301 is above a threshold magnitude 1302, thus turning on the middle emitter but not the emitters to the left and to the right of the middle emitter.

Hence, an embodiment of the present principles is based on the easiness of propagation of low frequency sound in water. The speed of sound in water is ~1500 m/s, and the attenuation is low at low frequencies. These properties allow for addressing irrigation nozzles located in different locations of a long irrigation pipe by making use of the sound resonances. In this approach, there is a sound source (possibly a speaker) powered by programmable wave generator, abutting a membrane which closes the first end of the irrigation pipe, and a second membrane that closes the opposite end, creating in this way a sound propagation similar to those occurring in a flute. In these conditions, the fundamental frequency $f_0$ is ~C/2L, where C is the speed of sound in water, and L is the pipe's length, which for a 1 Km long pipe $f_0$ is ~0.75 Hz For said situation, there are even and odd harmonics at $f_n=nC/2L$. As an example for localization of the pressure waves to selectively open or close irrigation nozzles along the pipe, we consider n=40, and n=60, respectively. For n=40, $f_{40}$=30 Hz, and a pressure maximum occurs every 25 m, whereas for n=60, $f_{60}$=45 Hz, and a pressure max occurs every 16.6 m. Thus, by adequately positioning the irrigation nozzles, they can be selectively addressed by a maximum in pressure.

Figure 14:
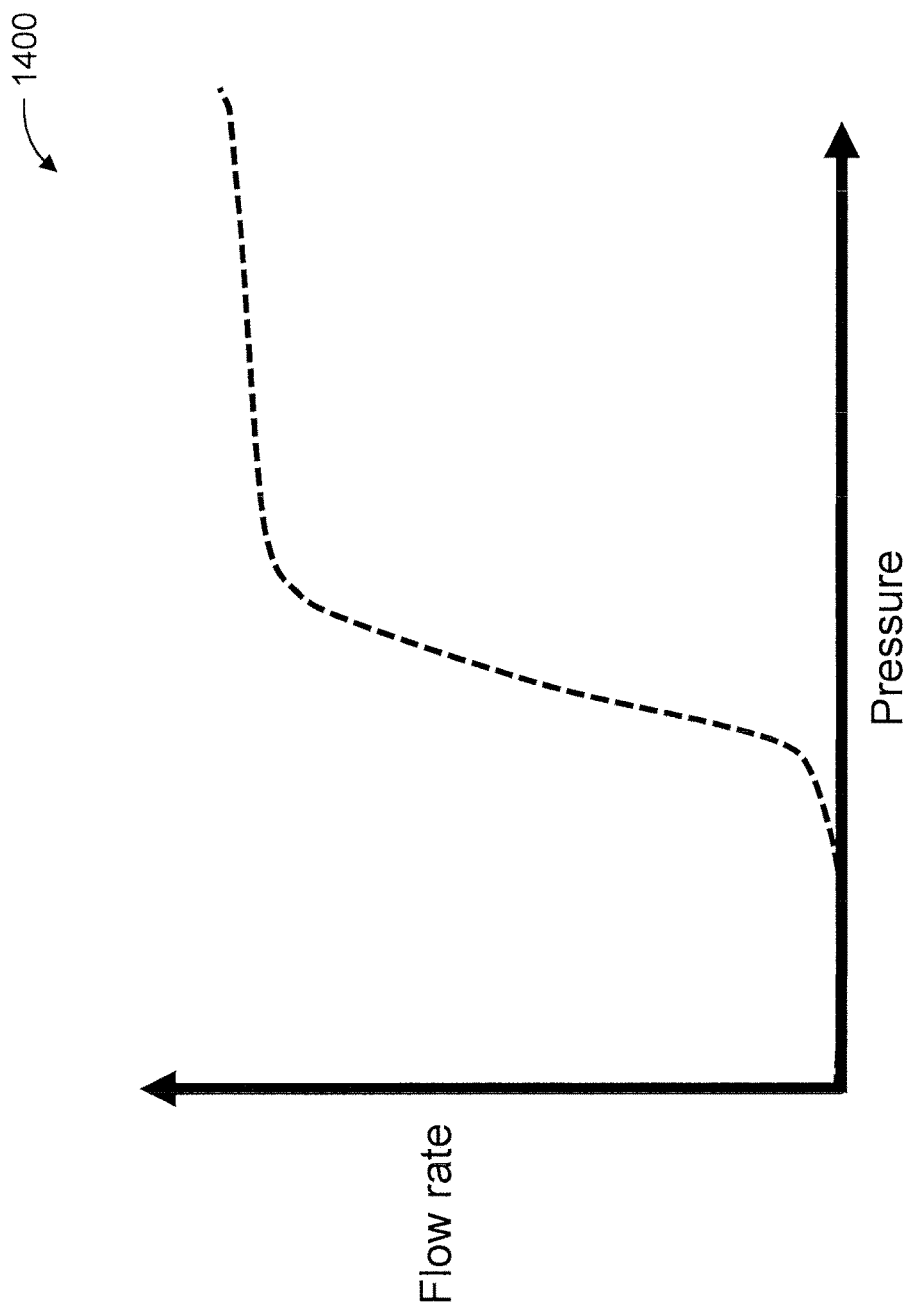
FIG. 14 shows a plot 1400 of flow rate versus pressure for a water emitter 510, in accordance with an embodiment of the present principles.

FIG. 14 shows a plot 1400 of flow rate versus pressure for a water emitter 510, in accordance with an embodiment of the present principles. At low pressure, the flow rate is zero and, upon reaching a threshold pressure, the flow rate increases to a desired amount.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A water irrigation system for irrigating a plurality of zones, comprising:
   a set of acoustic pressure modulators for generating a set of modulated acoustic pressure signals that include an actuating pressure signal and a de-actuating pressure signal, the set of acoustic pressure modulators including different subsets, wherein the different subsets control different ones of the plurality of zones by selectively providing the same or different ones of the actuating and de-actuating pressure signals to the different ones of the plurality of zones at any given time;
   a set of acoustically-reactive irrigating elements disposed in each of the plurality of zones, each including an acoustically-reactive oscillating disk based water emitter, the acoustically-reactive oscillating disk based water emitter being selectively actuated or de-actuated responsive to the actuating pressure signal and the de-actuating pressure signal, respectively; and
   tubing for carrying water for irrigation and the modulated acoustic pressure signals to the irrigating element.

2. The water irrigation system of claim 1, wherein the acoustically-reactive oscillating disk based water emitter performs drip irrigation, responsive to a specific oscillation frequency of the actuating pressure signal from the subset of acoustic pressure modulators in control thereof.

3. The water irrigation system of claim 1, wherein the tubing comprises segments separated by pressure attenuating tubing bends, each of the segments forming a separate one of the plurality of irrigation zones.

4. The water irrigation system of claim 3, wherein at least some of the acoustic pressure modulators provide different actuating signals and de-actuating signals to at least some of the plurality of irrigation zones at the any given time to provide differential irrigation between the plurality of irrigation zones.

5. The water irrigation system of claim 4, wherein the differential irrigation comprises different irrigation rates.

6. The water irrigation system of claim 4, wherein at least some of the plurality of irrigation zones are of different sizes.

7. The water irrigation system of claim 1, wherein the set of irrigating elements provide variable irrigation rates there between based on at least one of a frequency and a power of the actuating signal.

8. The water irrigation system of claim 1, wherein the set of acoustic pressure modulators comprises a set of audio speakers.

9. The water irrigation system of claim 1, wherein each of the irrigating elements in any given one of the plurality of zones are separately addressable for selective actuation and de-actuation at any given time.

10. The water irrigation system of claim 9, wherein the set of acoustic pressure modulators generate the actuating pressure signal for at least some of the irrigating elements in the given one of the plurality of zones based on a sum of pressure signals that exceed at least one of a threshold frequency and a threshold amplitude such that the at least some of the irrigating elements in the given one of the plurality of zones are active while remaining ones of the irrigating elements in the given one of the plurality of zones are inactive.

11. The water irrigation system of claim 10, wherein at least two of the pressure signals that are summed have at least one of different amplitudes and different frequencies.

12. A method for water irrigation for a plurality of zones, comprising:
   configuring a set of acoustic pressure modulators to generate a set of modulated acoustic pressure signals that include an actuating pressure signal and a de-actuating pressure signal, the set of acoustic pressure modulators including different subsets, wherein the different subsets control different ones of the plurality of zones by selectively providing the same or different ones of the actuating and de-actuating pressure signals to the different ones of the plurality of zones at any given time;
   configuring a set of acoustically reactive irrigating elements disposed in each of the plurality of zones, each including an acoustically-reactive oscillating disk based water emitter, the acoustically-reactive oscillating disk based water emitter being selectively actuated or de-actuated responsive to the actuating pressure signal and the de-actuating pressure signal, respectively; and
   configuring tubing to carry water for irrigation and the modulated acoustic pressure signals to the irrigating element.

13. The method of claim 12, wherein the tubing is configured into segments separated by pressure attenuating tubing bends, each of the segments forming a separate one of the plurality of irrigation zones.

14. The method of claim 13, further comprising configuring at least some of the acoustic pressure modulators to provide different actuating signals and de-actuating signals to at least some of the plurality of irrigation zones to provide differential irrigation between the plurality of irrigation zones.

15. The method of claim 14, wherein at least some of the plurality of irrigation zones are of different sizes, and wherein the differential irrigation comprises different irrigation rates.

16. The method of claim 12, wherein the set of irrigating elements is configured to provide variable irrigation rates there between based on at least one of a frequency and a power of the actuating signal.

17. The method of claim 12, wherein the irrigating elements in any given one of the plurality of zones are configured to be separately addressable for selective actuation and de-actuation at any given time.

18. The method of claim 17, wherein the set of acoustic pressure modulators is configured to generate the actuating pressure signal for at least some of the irrigating elements in a given one of the plurality of zones based on a sum of pressure signals that exceed at least one of a threshold frequency and a threshold amplitude such that the at least some of the irrigating elements in the given one of the plurality of zones are active while remaining ones of the irrigating elements in the given one of the plurality of zones are inactive.

* * * * *